United States Patent

[11] 3,571,848

[72] Inventor John L. Szajna
 Norridge, Ill.
[21] Appl. No. 791,034
[22] Filed Jan. 14, 1969
[45] Patented Mar. 23, 1971
[73] Assignee Continental Can Company, Inc.
 New York, N.Y.

[54] HIGH EXHAUST NEEDLE
 5 Claims, 6 Drawing Figs.
[52] U.S. Cl. .................................................. 18/5
[51] Int. Cl. ....................................... B29d 23/03
[50] Field of Search ........................................ 18/5 (BN),
 5 (BO), 5 (BA)

[56] References Cited
 UNITED STATES PATENTS
 3,089,185 5/1963 Settembrini .................. 18/5X
 3,114,931 12/1963 Pelikan ......................... 18/5X
 3,338,998 8/1967 Settemrini .................... 18/5X
 3,351,980 11/1967 Hehl ............................. 18/5

*Primary Examiner* — J. Spencer Overholser
*Assistant Examiner* — Ben D. Tobor
*Attorneys* — George E. Szekely, Joseph E. Kerwin and William A. Dittmann ABSTRACT: A blow mold is provided with a needle actuable to puncture a parison captured in the mold and to admit air into the parison for blowing a hollow article having the configuration of the mold. The needle is positioned to puncture the parison in a waste portion thereof. The barrel of the needle is substantially larger than the tip, beginning a short distance back of the point, the tip being sized to form a small initial puncture opening in the parison. The needle slides in a bore closely fitting the barrel. When the parison is blown, that portion surrounding the tip of the needle expands along the barrel, enlarging the puncture opening. After the parison is blown and the needle retracted, the air rapidly exhausts from the parison through the enlarged puncture opening, which communicates with atmosphere through a passage intersecting the needle bore.

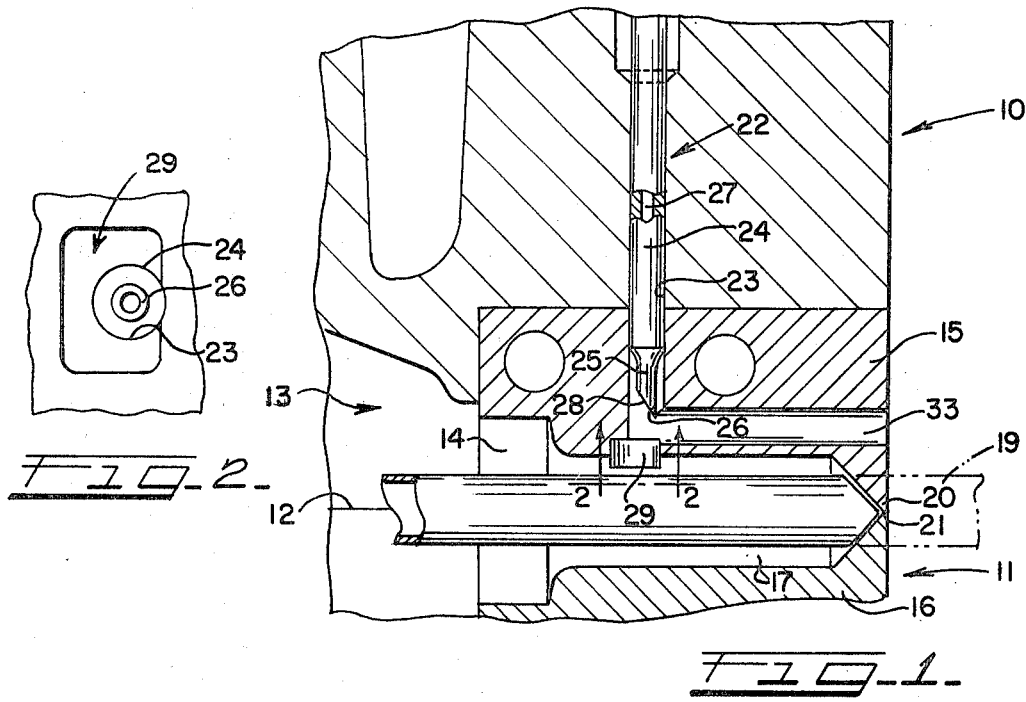
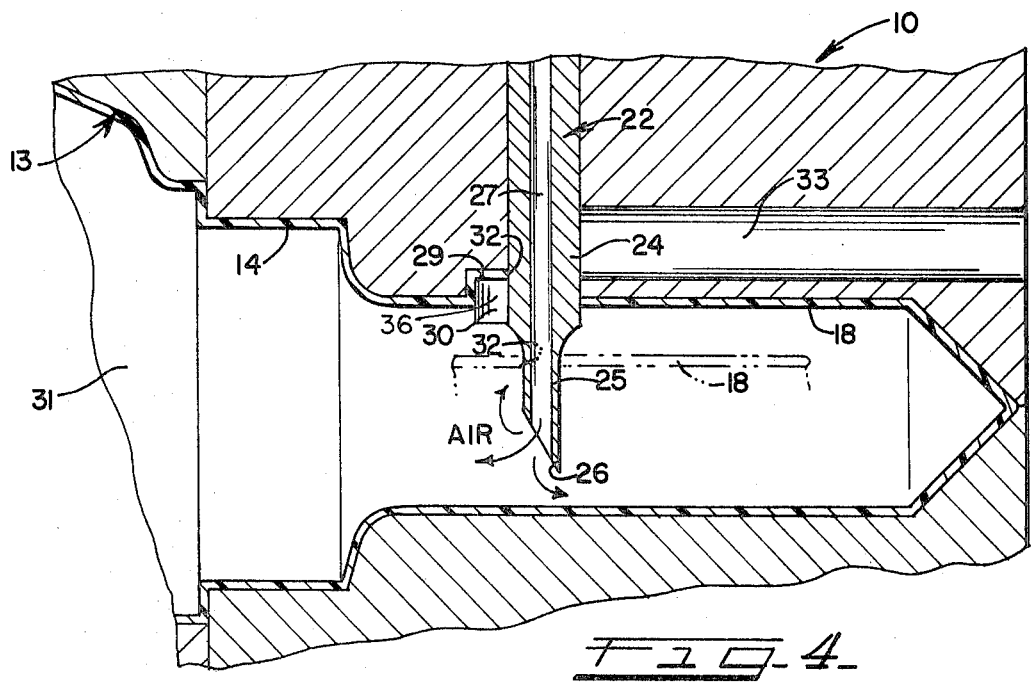

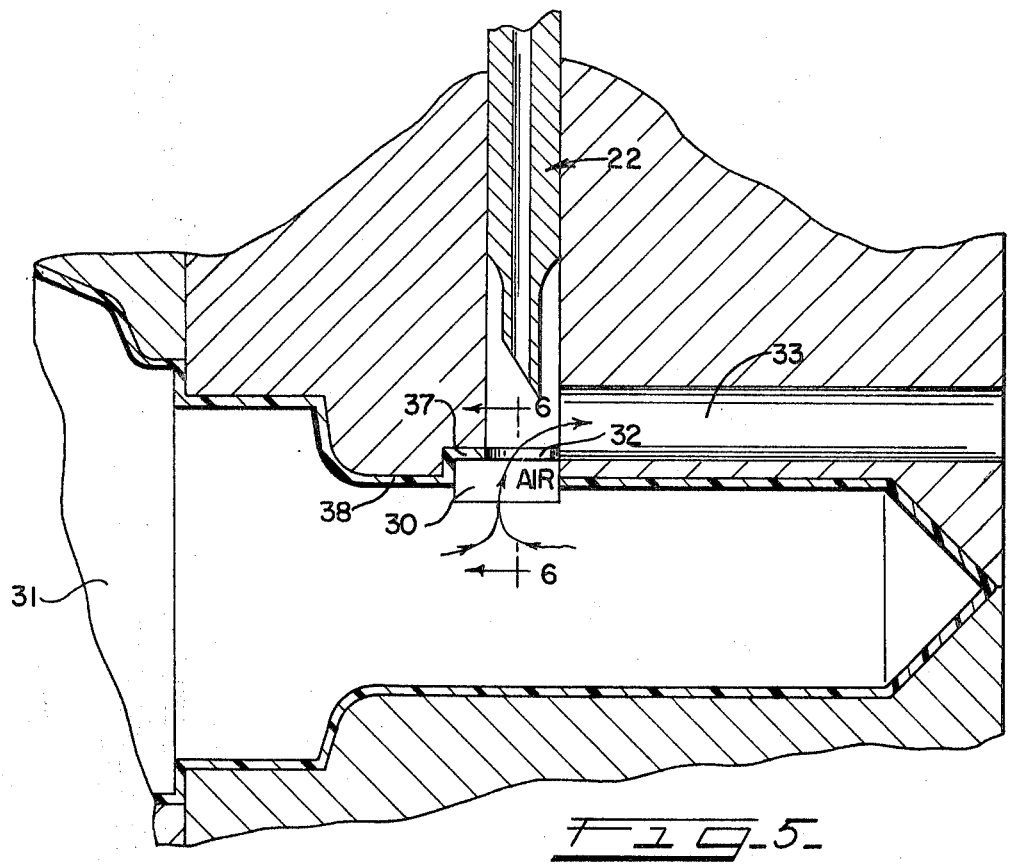
Fig. 5.
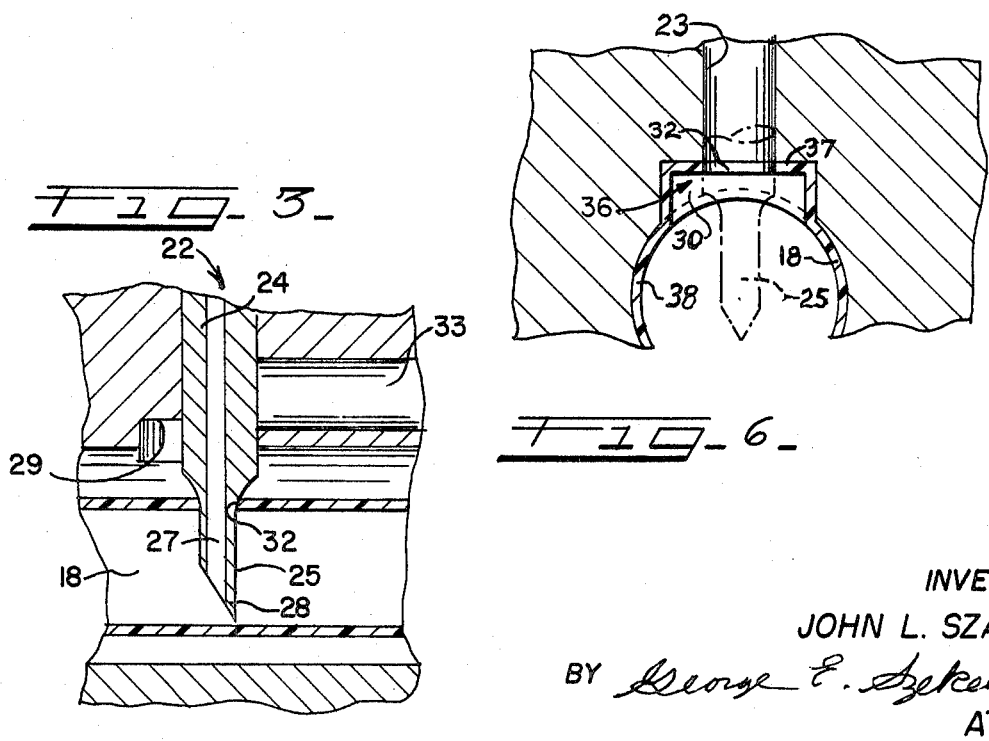
Fig. 3.
Fig. 6.
INVENTOR
JOHN L. SZAJNA
BY George E. Szekely
ATT'Y.

HIGH EXHAUST NEEDLE

BACKGROUND OF THE INVENTION

1. Field of the Invention

This invention relates to blow molds of the needle blow type, more particularly such molds for the production of relatively large hollow articles such as bottles, jugs and the like.

2. The Prior Art

In the molds of the needle blow type, the blow needle is usually carried in one mold half, in a position to puncture a waste portion of the parison when the mold is closed and thus admit high pressure air to the hollow parison to expand the parison to the configuration of the mold. When the parison is fully blown, the needle is withdrawn and the blow air exhausts through the puncture opening, which communicates with a suitable passage in the mold, extending from the cavity to atmosphere.

In order to assure a clean puncture, the tip of the needle is preferably quite small. Otherwise, even though the point is sharp, tearing or collapsing of the thin parison wall around the puncture area may prevent maintaining a good seal around the tip. Should the high pressure air leak between the puncture lip and the needle, air enveloping the parison may prevent the parison from blowing against the wall of the cavity, resulting in a dud.

Blow molds of the general type involved are often used for such articles as large bottles and jugs. The blowing air volume is rather large, so that a substantial time is required to exhaust the blowing air through the small puncture opening produced with prior needles. The mold cannot be opened for removal of the article until substantially all the blowing air has been exhausted, else the residual pressure inside the article will cause further expansion of the article beyond the size and shape determined by the mold. In fact, the article may rupture, particularly if of the thin-wall type not intended for pressurization. Furthermore, with certain plastic materials the small puncture opening may constrict upon withdrawal of the needle, still further aggravating the exhaust problem.

SUMMARY OF THE INVENTION

It is an object of this invention to provide a needle Blow structure for a blow mold which is adapted to form an opening in the parison wall of sufficient size for rapid exhaust of air from the blown article when the needle is withdrawn.

It is another object of this invention to provide a blowneedle structure for a blow mold whereby to effect an initially small puncture of the parison, insuring a clean puncture and a tight seal between the parison and the needle at the puncture, yet providing an ultimate puncture opening of enlarged size which will permit high flow rate of exhaust air, after the needle is withdrawn from the parison.

The foregoing objects are achieved by means of a novel needle and associated mold structure. The needle has a sharp point on a small tip. The barrel of the needle is substantially larger than the tip, the barrel enlargement being set back such amount that the enlargement projects into the mold just outside the parison wall when the point is at blow position with the parison. As the parison is blown, the wall portion at the opening expands and forms around the enlarged barrel, providing an ultimate puncture opening substantially larger in area than the small one made at puncture. In the case of the usually small parison and correspondingly small cavity diameter at the puncture location, the cavity is provided with a pocket surrounding the needle pilot bore, which houses the needle barrel. Upon blowing, the parison wall expands into the pocket, forming a boss around the puncture opening, compensating for the sharp cavity curvature and better assuring full formation and seal around the barrel. Upon retracting the needle, the high-pressure blowing air exhausts rapidly through the enlarged puncture opening, which communicates with the needle pilot bore, and thence to atmosphere through an exhaust passage intersecting the pilot bore near the cavity wall.

The foregoing and other objects and advantages of the invention will be apparent from the ensuing description, read in association with the accompanying drawings.

BRIEF DESCRIPTION OF THE DRAWING

FIG. 1 is a fragmentary section through a blow mold constructed according to this invention, showing the mold closed and needle in retracted position, preparatory to puncture;

FIG. 2 is a fragmentary view on line 2–2 of FIG. 1, showing the recess in the mold cavity surrounding the needle bore;

FIG. 3 is a fragmentary section showing the needle in blow position, before blowing;

FIG. 4 is a fragmentary section similar to FIG. 1, with needle advanced in blow position and parison blown to the cavity configuration;

FIG. 5 is a fragmentary section similar to FIG. 3, showing the blow needle retracted to permit exhausting air from the blown parison through the opening formed by the enlargement of the needle barrel; and FIG. 6 is a fragmentary section on line 6–6 of FIG. 5.

DESCRIPTION OF PREFERRED EMBODIMENT

Bottles and jugs are representative of articles suitable for blow molding with the apparatus of this invention. FIG. 1 is a section through a blow mold for a representative bottle, showing that portion of the mold cavity which includes the neck, being that portion in which the blowing air is introduced into the parison. The mold is partible in two halves 10 and 11 along the parting line 12. When closed as shown, the cavity, generally indicated at 13, has the configuration of the article to be formed, including a neck cavity portion 14. Since the bottle neck or finish involves particularly close dimensions, and neck variations may be required for different closures on the same bottle, the neck portion 14 is preferably formed by inserts 15 and 16.

The small cavity portion 17 beyond neck portion 14 serves to accommodate a waste portion of the parison 18, in which puncture for blowing is to be effected, so that the puncture does not occur in the finished bottle, the waste portion being ultimately cut off. The parison 18 is pinched closed and cut off from the tubular extrusion 19 by means of lip 20, 21. A similar arrangement at the other end of the mold, forming the bottom of the article, closes the parison 18 at the opposite end (not shown). Representative means of feeding an extrusion 19 and forming a parison thereof in a partible mold are shown in detail in U.S. Pat. No. 2,579,390, issued to Elmer E. Mills Dec. 18, 1951, the particular method and means for this purpose not forming part of this invention.

The blow needle 22 is here shown in its retracted position. The needle is a close sliding fit in bore 23, extending through neck insert 15 in the body of mold 10, at right angles to the axis of the parison 18. Needle 22 is arranged for reciprocation toward and away from the parison 18 by any suitable means.

Needle 22 comprises barrel 24, terminating in a tip 25, the tip being substantially smaller than the barrel and terminating in a sharp point 26, which is adapted to pierce the parison 18. An air passage 27 extends through the needle 22, so that air can be conducted through the needle 27 from a source from a source external to mold 10. Needle 22 may conveniently be made from a piece of tubing, machined and scarfed to form the tip 25 and point 26.

The scarf 28 of the needle tip 25 faces inward toward the main body of cavity 13. A pocket 29 is formed in the wall of the neck waste cavity 17, surrounding the bore 23 at its intersect with cavity 17. The pocket 29 is off center of bore 23 in the direction toward the main body of cavity 13, being the general direction of blow from needle 22, by virtue of the orientation of scarf 28. As best seen in FIG. 2, pocket 29 is generally rectangular and substantially larger in area than the area of bore 23.

FIG. 3 shows needle 22 in its advanced position, with the tip 25 projecting into the parison, and forming the puncture opening 32, initially the size of tip 25. Upon blowing, the parison 18 fills cavity 13, as seen in FIG. 4. Pressure on the order of 80 to 100 p.s.i. is maintained to form the parison fully, some of the material filling in the pocket 29 and maintaining a seal along the outside of barrel 24, so that air cannot leak out. The setback of the full barrel 24 from point 28 is of such amount that, with tip 25 in blow position in parison 18, the barrel 24 extends into cavity 17 to a position in proximity to the wall of unblown parison 18.

As blowing proceeds, to completion, as in FIG. 4, the opening is enlarged along barrel 24, parison 18 expanding into cavity 17 and into the pocket 29, forming a chamber 30 on the side of bore 23 toward neck cavity 14 and the body of cavity 13, that is, the body of the article 31. The neck waste diameter being typically rather small, the pocket 29 provides for a localized enlargement of the parison at the puncture opening, in the form of boss 36. As best seen in FIG. 4, the plane top wall 37 compensates for the small parison radius, establishing a final location of the puncture opening uniformly well up along the barrel 24. This allows for some variation in the extent to which the tip 25 is projected into cavity 17 and parison 18, without unduly short setback of the enlarged barrel 24 from point 26 and scarf 34. Too short a setback risks insufficient penetration of tip 25 into parison 18 upon puncture, as well as the possibility that shoulder 35 will strike the soft parison prematurely, which may collapse the parison and break the seal at the puncture opening. Furthermore, final formation of the puncture opening in the plane wall 37 best assures full enlargement and tightness on barrel 24.

FIG. 5 shows the blow needle 22 retracted to its original position of FIG. 1, the article now being fully blown. The high pressure air must be exhausted before the mold is opened, else the article will distend further. Upon withdrawal from parison 18, the needle 22 exposes the opening 32 formed in parison 18 by the barrel 24, the cross-axis diameter of opening 32 being virtually the same as that of bore 23. However, the effective opening is somewhat larger, by virtue of the intersect with chamber 30, as measured across an air flow line from the body of the bottle 31 toward the exhaust passage 33, which extends from its communication with bore 23 to atmosphere, in a direction parallel to the longitudinal axis of the mold 10, 11. Not only is the effective opening 32 substantially as full as the passage 33, but by virtue of chamber 30, the flow conditions between the interior of the article and atmosphere through passage 33 minimize turbulence and friction drop with air flowing from parison 18 substantially directly into passage 33, so that the air will exhaust from the article at a high average rate. The box configuration of the boss 36, around chamber 30, affords reenforcement in the region of opening 32, minimizing curl or draw tending to obstruct opening 32.

As best seen in FIG. 6, the outer wall 37 of boss 36 is planar and throughout lies outwardly of wall 38 of cavity 17. Therefore, the enlarged puncture opening 32 is formed in boss 36 through wall 37, unaffected by curvature of cavity wall 38, insuring that the opening 32 enlarges fully upon barrel 24. Otherwise as seen by the broken-line indication of tip 25 at blow position, the curvature of cavity wall 38 would limit expansion of parison 18 to a position such that portions of opening 32 would form below shoulder 39, of irregular shape and not fully enlarged. Considering possible variation in needle position and The requirement that barrel 24 be set back as far as possible, to avoid premature contact with parison 18 on puncture, the pocket 29 with plane wall 37 provides a safeguard against malformation and possible imperfect sealing at puncture opening 32.

The foregoing description of the invention is given by way of example. Modifications and variations in detail may be made by those skilled in the art without departing from the spirit of the invention and the scope thereof defined in the appended claims.

I claim:

1. In blow molding apparatus of the type having a mold with a cavity for housing a tubular, plastic parison; a bore in said mold communicating with said cavity; a blow needle reciprocable in said bore between a retracted position and a blow position, for piercing said parison and forming therein a puncture opening of predetermined initial size and for insertion into said parison, upon movement of said needle toward said blow position, for blowing said parison with pressure fluid to expand said parison to fill said cavity, for registering said opening with said bore, and for blocking said opening, with said needle in said blow position, and for unblocking said opening, upon movement of said needle from said blow position toward said retracted position; and a passage so disposed relative to said bore as to establish communication between said opening and atmosphere, for exhaust of said pressure fluid from said parison, upon said unblocking; the improvement comprising means for enlarging said opening to a size greater than said initial size, upon said blowing, whereby to facilitate said exhaust.

2. In blow molding apparatus, the improvement according to claim 1, characterized by said needle having a tip for forming said puncture opening of said initial size corresponding to the cross section size of said tip, upon said insertion, said means being a needle barrel of larger cross section than said tip, said barrel being concentric with said bore and joined to said tip at a setback distance such as for a portion of said barrel to be extended into said cavity upon said insertion, and for telescoping of said barrel in said opening to enlarge said opening to the cross section size of said barrel, to register said opening with said bore, and to block said opening, upon said blowing, said distance also being such as for said barrel to unblock said opening, upon said needle movement toward said retracted position.

3. In blow molding apparatus, the improvement according to claim 2, further characterized in that said bore communicates with a pocket in a wall of said cavity, said barrel portion extending into said pocket, upon said insertion, said pocket being disposed and sized for formation of a boss on said parison, with said enlarged puncture opening in said boss, outwardly of said wall, upon said blowing.

4. In blow molding apparatus, the improvement according to claim 3, further characterized in that said passage intersects said bore near said pocket, said pocket being so disposed as to form said boss with a chamber in said parison defined by said boss at said opening, and with said chamber and said opening generally opposite to said passage, whereby to mitigate friction loss in fluid flow from said parison to said passage, upon said exhaust.

5. In blow molding apparatus, the improvement according to claim 3, further characterized in that said cavity wall is curved, said pocket having a planar wall outward of said curved wall and transverse to said barrel, for formation of said boss with a planar wall having said puncture opening through said boss wall, clear of said curved wall.